Figures 1, 2:
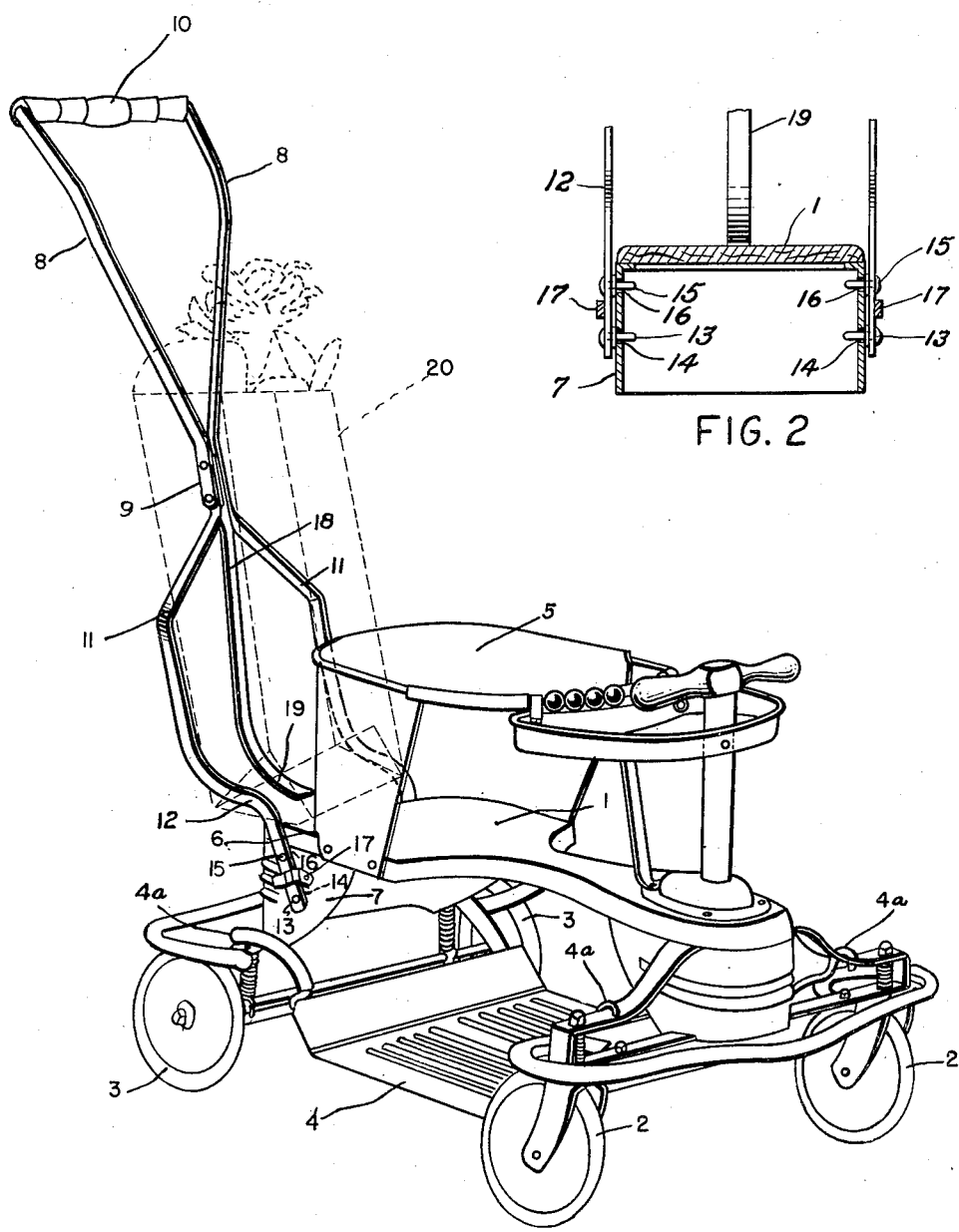

Jan. 3, 1950     D. W. GILL     2,492,981
HANDLE FOR VEHICLES
Filed March 14, 1945

INVENTOR.
Donald W. Gill
BY Allen & Allen
Attorneys

Patented Jan. 3, 1950

2,492,981

UNITED STATES PATENT OFFICE 2,492,981

HANDLE FOR VEHICLES

Donald W. Gill, Cincinnati, Ohio, assignor to Frank F. Taylor Co., Norwood, Ohio, a corporation of Ohio Application March 14, 1945, Serial No. 582,769

2 Claims. (Cl. 280—47)

My invention relates to detachable handles for children's vehicles of the baby walker-stroller type and particularly to a detachable handle provided with means for supporting a large package or bag.

The type of child's vehicle to which my invention relates is the type which the child can use in the house, directing its movement by walking action of the feet against the floor. By the attachment of a long push handle to such a vehicle, and a foot rest to keep the feet off the floor, the baby walker is convertible into a stroller conveyance and the mother, going to the store can conveniently push the child along just as if the vehicle was a conventional baby carriage. The space within the vehicle is however so taken up by the child that there is no room for any packages.

It is to this type of vehicle that my invention relates and to such a vehicle it is my object to provide a package support combined with the push handle, so that, returning from the store, the mother can conveniently convey the package and at the same time convey the child. The package support is preferably adequate for supporting the large size bag customarily used in self-service stores for holding all the shopper's purchases.

It is an essential element of the combination to which my invention relates that the detachable push handle be provided with means for attachment to the side walls of the vehicle and that it be contoured so as to provide a space between the handle and the back wall of the vehicle.

The foregoing general objects and other specific objects in the structural relationship of the combined elements to which reference will be made in the ensuing description, I accomplish by a construction of which I have shown, in the accompanying drawing, forming part of this application, a preferred modification and embodiment.

Referring to the drawing in Figure 1, I have shown a perspective view of a children's vehicle with a detachable push handle in combination with which my invention is illustrated. Figure 2 is a fragmentary view showing the manner in which the vehicle handle may be conveniently mounted on the vehicle.

The baby walker shown has a seat board 1, contoured to permit the child to straddle it. The front wheels 2 are freely pivotable, while the back wheels 3 are mounted on an axle extending across the frame.

As shown, the foot rest 4 is in position suspended by hooks 4a from the vehicle frame, but when the vehicle is used as a "walker" this foot rest is removed.

Surrounding the seat portion of the seat board there is shown a side and back wall support 5, formed from a flat sheet of material curved and cut away to fit across the seat board as indicated at 6, leaving portions of the seat board free to assist in supporting a package or bag. The sides of the vehicle, and which form a bracing for the seat board are indicated at 7 and it is to these sides that the handle which converts the vehicle into a "stroller" is attached.

Coming now to the detachable package carrying push handle, to which my invention relates, I have illustrated a push handle having two sets of frame members—upper side frame members 8 bent outwardly from a medial position 9 and embracing the end of the handle bar 10. At the medial position 9, side frame members 11 extend downwardly and are outwardly flaring to a sufficient extent to substantially equal the width between the sides 7 of the vehicle.

The members 11 are bent and so contoured as indicated at 12 as to provide substantially horizontal supports or guards for the bottom of a package or bag as will be described. Then the ends of the members 11 are provided with spaced lugs, a lower lug 13 which engages a hole 14 on the side of the vehicle and an upper lug 15 which engages a hole 16 on the side of the vehicle.

A pivoted clamp member 17 may be manually moved over into the position illustrated where it holds the ends of the members 11 in fixed position against the vehicle sides.

Intermediate the members 8 and 11 where they are assembled together in the position 9, there is a package or bag supporting bar 18. This bar is contoured as indicated at 19 to provide a substantially horizontal support for a bag or package. The length of the bar 18 is such as to make with the back edge of the seat board, a substantially continuous supporting surface. It should be noted that the plane of the portion 19 of bar 18 is slightly below the plane of the portions 12 of the bars 11.

There is indicated at 20 (in dotted lines), a bag full of groceries supported in the position for which the detachable push handle is designed. The bag as shown actually rests on the portion 19 of the bar 18. The uncurved portion of the bar 18 acts as a support for the back wall of the bag. The back wall of the member 5 acts as a support for the front wall of the bag and the members 11, 12 act as supports for the side walls of the bag.

In the medial position 9 the members 8, 11 and 18 may be joined together with bolts or in any other desirable manner. Likewise the means for attachment of the push handle to the vehicle may be modified in accordance with other mechanically obvious alternative constructions.

Having thus described my invention, what I claim as new and desire to secure by Letters Patent is:

1. A detachable push handle assembly for use in combination with a children's vehicle of the baby walker, stroller type, and which vehicle has a seat board and side walls, comprising a push handle, side frame members secured thereto and extending down, one on each side, from said push handle in a diagonal direction, then curving horizontally at an angle to the diagonal direction and then again extending downwardly in a diagonal direction, said last noted diagonally downwardly extending portions provided with means for attachment to the side walls of the vehicle, said push handle assembly having further an intermediate member extending down medially between said side members of such length as to have its end close to the back edge of the seat board of the vehicle, and so contoured as to provide with the seat board a continuous horizontal supporting surface for a bag or package, the supporting surface of said intermediate member adjacent its end lying slightly below the horizontal plane in which said side members are curved.

2. A detachable push handle for a baby walker for use when said baby walker is converted into a stroller and comprising spaced side bars extending down substantially vertically and spaced from the back of the baby walker and then curving forwardly substantially horizontally and then downwardly and provided at their ends with means for attachment to the baby walker, and having an intermediate member contoured to support in conjunction with said side bars a bag or package, said intermediate member of lesser length than the spaced side bars and extending in a horizontal arc, which toward its end, curves inwardly below the plane of the substantially horizontal portions of the spaced side bars in order to provide a support for the bottom of a bag or container, which bag or container bottom is supported on said intermediate member with its sides wedged in between the substantially horizontal portions of said side bars.

DONALD W. GILL.

REFERENCES CITED

The following references are of record in the file of this patent:

UNITED STATES PATENTS

| Number | Name | Date |
|---|---|---|
| D. 131,316 | Dann | Feb. 3, 1942 |
| D. 138,468 | Call | Aug. 8, 1944 |
| D. 144,975 | Leeb | June 11, 1946 |
| 1,125,571 | Lounsbery | Jan. 19, 1915 |
| 1,185,161 | Ambler | May 30, 1916 |
| 1,793,848 | Gill et al. | Feb. 24, 1931 |
| 2,375,389 | Shuler | May 8, 1945 |